252-95 AU 166 EX
5/2/78 XR 4,087,368

United States Patent [19]

Borrello

[11] 4,087,368

[45] * May 2, 1978

[54] WATER-SOLUBLE ENZYME GRANULES

[75] Inventor: Giuseppe Borrello, Anzio, Italy

[73] Assignee: Colgate-Palmolive Company, New York, N.Y.

[ * ] Notice: The portion of the term of this patent subsequent to Nov. 27, 1990, has been disclaimed.

[21] Appl. No.: 592,285

[22] Filed: Jul. 1, 1975

Related U.S. Application Data

[63] Continuation of Ser. No. 441,283, Feb. 11, 1974, abandoned, and Ser. No. 204,696, Dec. 3, 1971, abandoned.

[51] Int. Cl.$^2$ .......................... C07G 7/02; C11D 3/20; B11D 3/39; C11D 1/02

[52] U.S. Cl. .......................... 252/89 R; 195/63; 252/DIG. 12; 252/95; 252/132; 252/134; 252/174; 252/550

[58] Field of Search .......................... 195/63, 68, DIG. 4; 252/89, DIG. 12, 545, 550

[56] References Cited

U.S. PATENT DOCUMENTS

| | | | |
|---|---|---|---|
| 3,573,170 | 3/1971 | Clark et al. | 195/63 |
| 3,575,864 | 4/1971 | Innerfield | 195/63 X |
| 3,650,967 | 3/1972 | Johnson | 195/63 X |
| 3,775,331 | 11/1973 | Borrello | 195/68 X |
| 3,835,071 | 9/1974 | Allen et al. | 252/545 |
| 3,853,780 | 12/1974 | Mostom et al. | 252/DIG. 12 X |
| 3,858,854 | 1/1975 | Win et al. | 195/63 X |
| 3,931,034 | 1/1976 | Inamorato et al. | 252/DIG. 12 X |

OTHER PUBLICATIONS

Giers, et al., Dodecyl Alcohol Sulfates, Chemical Abstracts, vol. 48, 1954. (p. 12429f).

*Primary Examiner*—David M. Naff
*Attorney, Agent, or Firm*—Norman Blumenkopf; Herbert S. Sylvester; Murray M. Grill

[57] ABSTRACT

Water-soluble enzyme granules are prepared containing 5–95% by weight of a magnesium alkyl sulfate, 5–20% by weight of water and a proteolytic enzyme. The granules are produced by extrusion, and are in the form of cylindrical rods or spheres which have good flow properties, resistance to caking, segregation and dusting, and which are suitable for addition to particulate washing products.

6 Claims, No Drawings

WATER-SOLUBLE ENZYME GRANULES

This application is a continuation of application Ser. No. 441,283, filed Feb. 11, 1974, now abandoned, and of application Ser. No. 204,696, filed Dec. 3, 1971, now abandoned.

This invention relates to enzyme-containing fabric-cleaning compositions. While such compositions, usually containing proteolytic enzymes and/or amylases, are well known in the art and are highly useful, the stability of their enzyme content on aging is not as high as desired. This is especially noticeable when the composition contains a peroxy compound such as sodium perborate. Certain of these fabric-cleaning compositions also show a tendency for their enzyme content to separate therefrom in finely divided form.

In accordance with one aspect of this invention there is provided a new material which comprises granules of a blend of the enzyme and a magnesium higher alkyl (or ethoxylated) sulfate. Despite their ready solubility in water, the new granules show improved retention of enzyme content on storage alone or in admixture with perborate-containing detergent compositions.

The present invention makes it possible to provide enzyme-containing products which have good flow properties and are resistant to caking, segregation and dusting; which dissolve readily in the wash water and are thus quickly available during the washing process, and which have improved stability.

The granules of this invention may be of various shapes. In one suitable form they are short, generally cylindrical, rods whose diameters are in the range of about 0.3 to 1.0 mm (preferably about 0.4 to 0.8 mm) and whose lengths are in the range of about 1.0 to 20.0 mm (preferably about 2.0 to 10.0 mm). In another suitable form the granules are of spherical form, having diameters in the range of about 0.1 to 2.0 mm (preferably about 0.5 to 1.0 mm). Among other shapes mention may be made of cubes, rectangular prisms and parallelepipeds. Generally speaking, the average particle volume of the granules is preferably within the range of about 0.05 to 5.0 $mm^3$ but may vary within the limits of 0.005 to 20 $mm^3$.

In a preferred embodiment of the invention the magnesium compound is blended with the enzyme by simply mixing these ingredients in the presence of sufficient water to give a workable mass, which is then shaped into granular form. For example the powdered ingredients may (after grinding to eliminate large particles) be mixed with water to form a substantially uniform paste which can then be milled to improve its homogeneity, after which the milled product (e.g. in ribbon or flake form) can be passed through a plodder and extruded therefrom as a bundle of thin parallel threads; the threads may then be surface-hardened, as by cooling, dried to remove some of their moisture, and then broken up in a granulating apparatus. In another method the water-containing workable mass is extruded (e.g. by using a twin screw extruder) to form thin short rods which are then rounded by rapidly rolling them, while they are in plastic condition, into generally spherical shape. These procedures generally give granules that are compact and whose individual granule density is about 1 gram per cubic centimeter, e.g. in the range of about 1.2 to 1.6 grams per cubic centimeter.

Other ingredients may be present together with the magnesium higher alkyl sulfate and the enzyme. For example, the enzyme is usually supplied commercially as a powder in which the organic enzyme itself is diluted wtih inorganic materials, e.g., salts such as calcium sulfate, sodium chloride, sodium sulfate, pentasodium tripolyphosphate and other materials. Additionally it may be desirable to add more filler or diluent to improve the workability and/or decrease the enzyme activity. The addition of more sodium sulfate, for example is particularly beneficial since at the temperatures developed during working and extruding the workability is especially facilitated. Total sulfate content may vary from 0 to 60% with 15 to 40% preferred.

In the granules, the magnesium compound acts as a binder or matrix for the enzyme and inorganic materials. The proportion of magnesium binder in the granules is preferably in the range of about 5 to 95%, and more, preferably about 20 to 60%.

The proportion of water (including water of hydration) in the granules is preferably in the range of about 5 to 20%, more perferably 8 to 15%. Available moisture, i.e. available as water in the processing of the granules, should range from about 5 to 15% and preferably 8 to 11%.

In the most useful forms of the invention to date the enzume comprises a proteolytic enzyme which is active upon protein matter and catalyzes digestion or degradation of such matter when present as in linen or fabric stain in a hydrolysis reaction. Typically, the enzymes may be effective at a pH range of say about 4 to 12, and may be effective even at moderately high temperatures so long as the temperature does not degrade them. Some proteolytic enzymes are effective at up to about 80° C. and higher. They are also effective at ambient temperature and lower to about 10° C. Particular examples of proteolytic enzymes which may be used in the instant invention include pepsin, trypsin, chymotrypsin, papain, bromelin, colleginase, keratinase, carboxylase, amino pepidase, elastiase, subtilisia and aspergillopepidase A and B. Preferred enzymes are subtilisin enzymes manufactured and cultivated from special strains of spore forming bacteria, particularly Bacillus subtilis.

Proteolytic enzymes such as Alcalase, Maxatase, Protease AP, Protease ATP 40, Protease ATP 120, Protease L-252 and Protease L-423 are among those enzymes derived from strains of spore foaming bacillus, such as Bacillus subtilis.

Different proteolytic enzymes have different degrees of effectiveness in adding in the removal of stains from textiles and linen. Particularly preferred as stain removing enzymes in this invention are subtilisin enzymes.

Metalloproteases which contain divalent ions such as calcium, magnesium or wire bound to their protein chains are of interest.

The enzyme preparations are frequently extremely fine, often substantially impalable, powders. In a typical powdered enzyme preparation the particle diameter is mainly below 0.15 mm, generally above 0.01 mm, eg. about 0.1mm; for example, as much as 90% of the material may pass through a 100 mesh (U.S. Standard) sieve. In contrast, conventional spray-dried granules of detergent compositions are usually of very much larger particle size, with the major portion of the granules being at least about 0.2 mm in diameter, e.g. about 0.3 or 0.4, or even 0.5 or 1 to 2 mm.

The commercial enzyme preparations, which (as previously indicated) generally contain relatively large amounts of diluent salt are typically stable in the pH range of 5 to 10 and at an alkaline pH of 8.5 to 9. They can withstand temperatures of 49° C. to 77° C. with relatively little decomposition for time periods varying from 2 hours at the higher temperatures to more than 1 day at the lower temperatures. Different proteolytic enzymes have different degrees of effectiveness in aiding in the removal of stains from textiles and linen.

Instead of, or in addition to, the proteolytic enzyme, an amylase may be present such as a bacterial amylase of the alpha type (e.g. obtain by fermentation of B. subtilis). One very suitable enzyme mixture contains both a bacterial amylase of the alpha type and an alkaline protease, preferably in proportions to supply about 100,000 to 400,000 Novo alpha-amylase units per Anson unit of said alkaline protease.

In a preferred form of the invention the amount of proteolytic enzyme preparation is such as to provide about 0.1 to 4.0 Anson units per gram of the new granules, more preferably in the range of about 0.100 to 2.00 Anson units per gram of granules.

The magnesium compounds contemplated herein comprise the magnesium higher alkyl sulfates as well as the ethoxylated derivatives thereof. The alkyl moieties of the unethoxylated compounds should have an average chain length of between about 10 and 16 carbon atoms, with compounds within the range of $C_6$ to $C_{18}$ being generally useful provided the average chain length present is $C_{10}$ to $C_{16}$. Particularly useful and outstanding products are magnesium lauryl sulfate, magnesium tallow alcohols sulfate, magnesium $C_{12}$ to $C_{14}$ sulfate, and magnesium $C_8$ to $C_{18}$ sulfate. The ethoxylated derivatives of the aforementioned compounds are those which contain from about 5 to 50 mols of ethylene oxide per mol of alcohol sulfate. Specific mention may be made of magnesium lauryloxy tetraethenoxy ethanol sulfate and magnesium lauryloxy nonaethenoxylethanol sulfate.

The following Examples are given to illustrate this invention further. All proportions in the application are by weight and all seive or screen sizes are U.S. Standard, unless otherwise indicated.

EXAMPLE 1

The following composition is prepared, 35 parts of magnesium alkyl sulfate (alkyl range from $C_8$ to $C_{18}$ — average molecular weight 282; approximate distribution $C_8$— 10–15%; $C_{10}$— 10–20%; $C_{12}$— 20–25%; $C_{14}$— 25–30%; $C_{16}$— 5–10%; $C_{18}$— 2–5%) 50 parts of a powdered proteolytic enzyme material (1.5 Anson units/g. activity) are thoroughly mixed in a soap type amalgamator, and then 8 parts of (0.015 parts FD & C Blue 1 and 0.40 parts D & C Green 8) are sprayed over the mixture. Mixing is continued until the product is uniform in color and texture and it is then discharged on a standard three-roll mill (clearance about 0.5 mm) which is maintained at about room temperature (i.e. 20° C) by means of circulating water. The resultant milled ribbons or strings are discharged onto an endless belt which feeds the hopper of a standard screw extruder-type plodder.

The plodder is equipped with a perforated plate whose holes are each about 12–16 mm in diameter, and a 35 mesh wire net screen (having 0.5 mm apertures) just downstream of the plate. In the plodder, the ribbons (or flakes obtained therefrom) are continuously conglomerated and extruded through the perforated plate by action of the rotating screw and the extrudate is continuously cut to form a bundle of thin, parallel threads or rolls by passing through the screen. The temperature in the barrel of the plodder is maintained at 20° C by circulating water through the jacket surrounding the extrusion section.

To prevent the extruded threads from sticking together after extrusion, they are cooled immediately by a jet of air at a temperature of about 5° to 20° C as they emerge from the plodder. This treatment hardens the surface of the threads. Such surface-hardened threads are air dried at a temperature of about 5° to 20° C endless belt without further movement of the individual threads relative to each other until a firm texture results and are then discharged into a granulator apparatus equipped with an 8-mesh screen. The resultant green particulate product is in the form of thin generally cylindrical rods having an average cross-sectional area of 0.25 $mm^2$, and a length of 3–4 mm. The specific gravity of the product is 1.4 gm./cc. and the bulk density of the product is 0.7 gm./cc.

Approximately 2% by weight of water is lost during the extrusion and cooling steps. For example, the ribbons fed to the extruder contain 9.5% by weight of water; whereas, the final product contains 7.7% by weight of water.

The solubility of the particulate products is determined by measuring the time in seconds required to dissolve 1 gm of product in 300 ml of 20° C water (in a cylindrical vessel of 600 $cm^3$ volume) agitated by a 50 mm diameter propeller rotating at 180 rpm. All of the particles dissolved within 90 seconds. Such a particulate product is characterized as fast dissolving or rapidly soluble because the usual solubility rate for spray-dried detergent in this test is from 100 to 600 seconds. The product has excellent stability when mixed with a heavy duty spary dried detergent containing sodium perborate to provide a highly effective green-dot-colored (free flowing) composition. Thus in one formulation 2.8 parts of the enzyme concentrate is mixed with 25.0 parts of small pellets of sodium perborate tetrahydrate and 72.2 parts by weight of un-colored, spray-dried hollow beads of a composition containing, by weight, about 45% sodium tripolyphosphate, about 12% sodium soap of tallow, about 7% of ethoxylated polyalkylene glycol nonionic detergent ("Tergitol XD"), about 8% sodium silicate, about 8% moisture and a balance of sodium sulfate.

EXAMPLE 2

The general procedure of Example 1 is followed to make the granules except that the components of the composition comprises: 41 parts magnesium lauryl sulfate (contains about 6 parts $H_2O$) 24.4 parts of sodium sulfate, 25 parts of Alcalase proteolytic enzyme (6% active enzyme and about 21.2 parts sodium sulfate - enzyme activity of 1.5 Anson units/g.), and 5 parts water.

The ribbons leaving the three-roll mill contain about 9.7% moisture while the extruded and sieved product contains about 8.2% moisture.

The product shows outstanding stability with substantially no loss of enzyme content after aging in tests (at room temperature for 50 and 100 days and at 43° C for 4 weeks) of the product alone as well as in admixture with 35 times its weight of the perborate-containing detergent composition of Example 1. The solution speed of the granules is about 2 minutes.

EXAMPLE 3

Example 2 is repeated but with the addition of the coloring agents and amounts thereof used in Example 1. Results comparable to Example 2 are obtained.

EXAMPLE 4

(a) The ingredients described in Example 2 are mixed in the same proportions and extruded through a turn-screw extruder of the Elanco type, which has a multi-perforated cylindrical plate at its discharge end, so that the mixture is extruded outwardly, through the perforations of the plate, to form thin short cylindrical rods or threads, the holes in the screen are circular, 1 mm in diameter, and the resulting rods are also of generally circular cross section and about 1 mm in diameter. The rods are then formed into spheres, also about 1 mm in diameter, by the action of a "Marumerizer." The latter has a horizontal dish rotating on a vertical axis at a high speed (e.g. 300–1500 rpm) and having a corrugated upper surface enclosed in a stationary vessel having a vertical cylindrical inner wall situated close to the outer edge of the horizontal dish. As is well known in the art in the operation of the Marumerizer the cylindrical rods are fed onto the top of the dish, centrifugal force and friction first break them and then cause them to roll in a helical toroidal path around the inner wall of vessel (at a peripheral speed estimated to be on the order of 100 kg/hr) so that they are converted to spherical rods during this operation (on a simple trial-and-error basis) to give them optimum plasticity for sphere formation.

(b) The 0.5 mm diameter rods or threads produced in Example 3 are converted into spheres of about 0.5 mm diameter, using the Marumerizer, in the same manner as described above.

EXAMPLE 5

The general procedure for making granules described in Example 2 is followed using the same composition, except that the Alcalase enzyme contains 50% sodium tripolyphosphate (34% calculated as $P_2O_5$), dedusted with 4% ethoxylated nonly phenyl (11 mols ethylene oxide per mol of nonyl phenol).

The presence of coarse particles in the enzyme preparation requires that the 0.5 mm wire net described in Example 1 be replaced by one having 0.5 mm free opening to prevent clogging.

The proteolytic enzyme preparation used in the foregoing Examples is Alcalase, sulfate type.

The enzyme is a subtilisin enzyme having its maximum proteolytic activity at a pH of 8–9. This activity is measured at pH 7.5 on the commercial enzyme preparation available from Novo Industry A/S, Copenhagen, Denmark, is about 1.5 Anson units per gram of the enzyme. The commercial enzyme preparation is a raw extract of *Bacillus subtillis* culture and contains about 6% of pure crystallyzed proteolytic material. The preparation is an extremely fine powder; typically the particle diameter is mainly below 0.15 mm, generally above 0.01 mm, e.g. about 0.1 mm, and as much as 50% or even 75% of material may pass through a 100 mesh sieve. The preparation contains from about 83 to 88% $Na_2SO_4$. Its organic content is in the neighborhood of 11%.

The enzyme-containing granules produced in accordance with this invention may be added to a wide variety of washing products. Thus, they may be incorporated in a laundry presoak product or in a laundry detergent or in a dishwashing product. A typical presoak product contains a relatively high concentration of builder salt such as about 30 to 95% pentasodium tripolyphosphate (calculated as anhydrous pentasodium tripolyphosphate), about 2 to 10% of organic surface active detergent, plus other ingredients such as sodium silicate (which acts as a builder salt and also acts to inhibit corrosion of aluminum surfaces), brightening agents and sodium sulfate. A laundry detergent generally has a lower ratio of builder salt to organic surface active agent (e.g. a ratio in the range of about 5:1 to 15:1). Dishwashing products, designed for use in automatic dishwashers, are on the other hand usually more alkaline, containing a very high proportion of alkaline builder salt, such as a mixture of the pentasodium tripolyphosphate and sodium silicate; they contain little, if any, organic surface active detergent, e.g. about 0.2 to 3%, and usually also contain a minor proportion (e.g. 0.5 to 5%) of an agent to prevent water-spotting such as a dry water-soluble compound which on contact with water, liberates hypochlorite chlorine (e.g. a heterocyclic dichloroisocyanurate); alternatively, a chlorinated phosphate (such as the well known chlorinated trisodium phosphate) may be used to supply both hypochlorite chlorine and some phosphate.

In formulating the washing products, the water-soluble builder salts may be phosphates and particularly condensed phosphates (e.g. pyrophosphates or tripolyphosphates), silicates, borates and carbonates (including bicarbonates), as well as organic builders such as salts of nitrilotriacetic acid or ethylene diamine tetracetic acid. Sodium and potassium salts are preferred. Specific examples are sodium tripolyphosphate, potassium pyrophosphate, sodium hexametaphosphate, sodium carbonate, sodium bicarbonate, sodium sesquicarbonate, sodium tetraborate, sodium silicate, salts (e.g. Na salt) of methylene diphosphonic acid, disodium dyglycollate, trisodium nitrilotriacetate, or mixtures of such builders, including mixtures of pentasodium tripolyphosphate and trisodium nitrilotriacetate in a ratio, of these two builders, of 1:10 to 10:1, e.g. 1:1.

The organic surface active agent may be an anionic, nonionic or amphoteric surface active agent; mixtures of two or more such agents may be used.

The anionic surface active agents include those surface active or detergent compounds which contain an organic hydrophobic group and an anionic solubilizing group. Typical examples of anionic solubilizing groups are sulfonate, sulfate, carboxylate, phosphonate and phosphate. Examples of suitable anionic detergents which fall within the scope of the invention include the soaps, such as the water-soluble salts of higher fatty acids or resin acids, such as may be derived from fats, oils and waxes of animal, vegetable origin, e.g. the sodium soaps of tallow, grease, coconut oil, tall oil and mixtures thereof; and the sulfated and sulfonated synthetic detergents, particularly those having about 8 to 26, and preferably about 12 to 22, carbon atoms to the molecule.

As examples of suitable synthetic anionic detergents there may be cited the higher alkyl mononuclear aromatic sulfonates such as the higher alkyl benzene sulfonates containing from 10 to 16 carbon atoms in the alkyl group in a straight or branched chain, e.g., the sodium salts of higher alkyl benzene sulfonates or of the higher alkyl toluene, xylene and phenol sulfonates; alkyl naphthalene sulfonate, ammonium diamyl naphthalene sulfonate, and sodium dinonyl naphthalene sulfonate. In one preferred type of composition there is used a linear alkyl benzene sulfonate having a high content of 3- (or higher) phenyl isomers and a correspondingly low content (well below 50%) of 2- (or lower) phenyl isomers; in other terminology, the benzene ring is preferably attached in large part at the 3 or higher (e.g. 4, 5, 6 or 7) position of the alkyl group and the content of isomers in which the benzene ring is attached at the 2 or 1 position is correspondingly low. Particularly preferred materials are set forth in U.S. Pat. No. 3,320,174, May 16, 1967, of J. Rubinfeld.

Other anionic detergents are the olefin sulfonates, including long chain alkene sulfonates, long chain hydroxyalkane sulfonates or mixtures of alkenesulfonates and hydroxylalkane-sulfonates. These olefin sulfonate detergents may be prepared, in known manner, by the reaction of $SO_3$ with long chain olefins (of 8–25, preferably 12–21, carbon atoms) of the formula $RCH{=}CHR_1$, where R is alkyl and $R_1$ is alkyl or hydrogen, to produce a mixture of sultones and alkenesulfonic acids, which mixture is then treated to convert the sultones to sulfonates. Examples of other sulfate or sulfonate detergents are paraffin sulfonates having, for example, about 10–20, preferably about 15–20, carbon atoms such as the primary paraffin sulfonates made by reacting long chain alpha olefins and bisulfites (e.g. sodium bisulfite) or paraffin sulfonates having the sulfonate groups distributed along the paraffin chain such as the products made by reacting a long chain paraffin with sulfur dioxide and oxygen under ultraviolet light followed by neutralization with NaOH or other suitable base (as in U.S. Pat. Nos. 2,503,280; 2,507,088; 3,260,741; 3,372,188 and German Patent 735,096); sulfates of higher alcohols; salts of α-sulfofatty esters (e.g. of about 10 to 20 carbon atoms, such as methyl α-sulfomyristate or α-sulfotallowate).

Examples of sulfates of higher alcohols are sodium lauryl sulfate, sodium tallow alcohol sulfate, Turkey Red Oil or other sulfated oils, or sulfates of mono- or di-glycerides of fatty acids (e.g. stearic monoglyceride monosulfate), alkyl poly (ethenoxy) other sulfates such as the sulfates of the condensation products of ethylene oxide and lauryl alcohol (usually having 1 to 5 ethenoxy groups per molecule); lauryl or other higher alkyl glyceryl ether sulfonates, aromatic poly (ethenoxy) ether sulfates such as the sulfates of the condensation products of ethylene oxide and nonyl phenol (usually having 1 to 6 oxyethylene groups per molecule).

The suitable anionic detergents include also the acyl sarcosinates (e.g. sodium lauroylsarcosinate) the acyl esters (e.g. oleic acid ester) of isethionates, and the acyl N-methyl taurides (e.g. potassium N-methyl lauroyl- or oleyl tauride).

The most highly preferred water soluble anionic detergent compounds are the ammonium and substituted ammonium (such as mono-, di- and triethanolamine), alkali metal (such as sodium and potassium) and alkaline earth metal (such as calcium and magnesium) salts of the higher alkyl benzene sufonates, olefins sulfonates, the higher-alkyl sulfates, and the higher fatty acid monoglyceride sulfates. The particular salts will be suitably selected depending upon the particular formulation and the proportions therein.

Nonionic surface active agents include those surface active or detergent compounds which contain an organic hydrophobic group and a hydrophilic group which is a reaction product of a solubilizing group such as carboxylates, hydroxyl, amido or amino with ethylene oxide or with the polyhydration product thereof, polyethylene glycol.

As examples of nonionic surface active agents which may be used there may be noted the condensation products of alkyl phenols with ethylene oxide, e.g., the reaction product of isooctyl phenol with about 6 to 30 ethylene oxide units; condensation products of alkyl thiophenols with 10 to 15 ethylene oxide units; condensation products of higher fatty alcohols such as tridecyl alcohol with ethylene oxide; ethylene oxide addends of monoesters of hexahydric alcohols and inner ethers thereof such as sorbitan monolaurate, sorbitol monooleate and mannitan monopalmitate, and the condensation products of polypropylene glycol with ethylene oxide.

A particularly suitable composition, for use as a granular detergent material contains a mixture of a linear alkylbenzenesulfonate, as previously described, soap and nonionic detergent, with the soap and nonionic detergent being present in minor portions. The ratios of the amount of (A) soap, and (B) nonionic detergent, to (C) the total amount of the synthetic anionic sulfate and sulfonate detergent, in this mixture, are preferably as follows: A:C, about 1:10 to 1:2, preferably about 1:4 to 1:6, on an anhydrous basis, B:C about 1:10 to 1:3, e.g. about 1:4 to 1:6, on an anhydrous basis. The component (C) may comprise a blend of the linear alkylbenzenesulfonate detergent with other anionic synthetic sulfate or sulfonate detergents (e.g. olefin sulfonates, paraffin sulfonates having the sulfonate groups distributed along the paraffin chain, or alkyl sulfates) with the alkylbenzenesulfonate constituting, say, one-third, one-half or two-thirds of this blend.

Examples of suitable amphoteric detergents are those containing both an anionic and a cationic group and a hydrophobic organic group, which is advantageously a higher aliphatic radical, e.g. of 10 to 20 carbon atoms. Among these are the N-long chain alkyl aminocarboxylic acids (e.g. of the formula

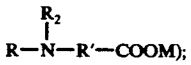

the N-long chain alkyl iminodicarboxylic acids (e.g. of the formula $RN(R'COOM)_2$) and the N-long chain alkyl betaines (e.g. of the formula

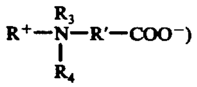

where R is a long chain alkyl group, e.g. of about 10–20 carbons, R′ is a divalent radical joining the amino and carboxyl portions of an amino acid (e.g. an alkylene radical of 1–4 carbon atoms), N is hydrogen or a salt-forming metal, $R_2$ is a hydrogen or another monovalent substituent (e.g methyl or other lower alkyl), and $R_3$ and $R_4$ are monovalent substituents joined to the nitrogen by carbon-to-nitrogen bonds (e.g. methyl or other lower alkyl substituents). Examples of specific amphoteric detergents are N-alkyl-beta-aminopropionic acid; N-alkyl-beta-iminodipropionic acid, and N-alkyl, N,N-dimethyl glycine; the alkyl group may be, for example, that derived from coco fatty alcohol, lauryl alcohol, myristyl alcohol (or a laurylmyristyl mixture), hydrogenated tallow alcohols, cetyl, stearyl, or blends of such alcohols. The substituted aminopropionic and iminodipropionic acids are often supplied in the sodium or other salt forms, which may likewise be used in the practice of this invention. Examples of other amphoteric detergents are the fatty imidazolines such as those made by reacting a long chain fatty acid (e.g. of 10 to 20 carbon atoms) with diethylene triamine and monohalocarboxylic acids having 2 to 6 carbon atoms, e.g. 1-coco-5-hydroxethyl-5-carboxymethylimidazoline; betaines containing a sulfonic group instead of the carboxylic group; betaines in which the long chain substituent is joined to the carboxylic group without an intervening nitrogen atom, e.g. inner salts of 2-trimethylamino fatty acids such as 2-trimethylaminolauric acid, and compounds of any of the previously mentioned types but in which the nitrogen atom is replaced by phosphorous.

Various other materials may be present in the granular washing products. Thus, materials such as the higher fatty acid amides may be added to improve detergency and modify the foaming properties in a desirable manner. Examples thereof are the higher fatty acid alkanolamide, preferably having 2–3 carbons in each alkanol group and a fatty acyl radical within the range of 10–18 carbons, preferably 10–14 carbons, such as lauric or myristic monoethanolamides, diethanolamides and isopropanolamides. Tertiary higher alkyl amino oxides such as having about 10–18 carbons in one alkyl group, e.g. lauryl or myristyl dimethylamine oxides, may be added also. Fatty alcohols of 10–18 carbons such as lauryl or coconut fatty alcohols, or cetyl alcohol are suitable additives also. A hydrotropic material such as the lower alkyl aryl sulfonates, e.g. sodium toluene or xylene sulfonates, can assist processing also. In general, these materials are added in minor amounts, usually from about 1/2 to 10% preferably 1 to 6%, based on the total solids.

The washing products may also contain optical brightening agents or fluorescent dyes (e.g. in amount in the range of about 1/20% to 1/2%); germidical ingredients such as halogenated carbanilides, e.g. trichlorocarbanilide, halogenated salicylanilide, e.g. tribromosalicylanilide, halogenated bisphenols, e.g. hexachlorophene, halogenated trifluoromethyldiphenyl urea, zinc salt of 1-hydroxy-2-pyridinethione and the like (e.g. in amounts in the range of about 1/50% to 2%); soil-suspending agents such as sodium carboxymethyl cellulose or polyvinyl alcohol, preferably both, or other soluble polymeric materials such as methyl cellulose (the amount of suspending agent being, for example, in the range of about 1/20% to 2%); antioxidants such as 2,6-di-tert-butylphenol, or other phenolic antioxidant materials (e.g. in amounts in the range of about 0.001 to 0.1%), coloring agents, bleaching agents and other additives.

The washing products, to which the enzyme-containing granules are added, are most often in the form of spray-dried hollow beads or spongeous low density granules. As previously indicated, their particle sizes are usually such that a major portion is at least about 0.2 mm in diameter, e.g. about 0.3 or 0.4, or even 0.5 or 1 to 2 mm.

As indicated, the washing product may contain a peroxy compound, such as sodium perborate (e.g. sodium perborate tetrahydrate or monohydrate or sodium percarbonate).

The proportion of peroxy compound in the washing product is preferably such as to provide in the range of about 2 to 3% active oxygen based on the weight of washing powder. Typically the proportion of sodium perborate tetrahydrate is in the range of about 10 to 30% based on the total weight of the washing product with 25% being an often used amount. It is common to add the peroxy compound in dry particulate form to the solid particulate washing compound.

The amount of the enzyme-containing granules added to the washing product is relatively small, usually being such that the content of powdered enzyme preparation in the final product is, for example, in the range of about 0.1% to 4%, preferably 0.3% to 2%; for a powdered enzyme preparation having an alkaline protease content of 1.5 Anson units per gram this represents about 0.15 to 6 Anson units (preferably about 0.45 to 3 Anson units) per 100 grams of the final product. It will be understood that the amount of the enzyme mixture present in the washing product will, of course, depend to some extent on the amount of the washing product which is to be added to the wash water. For washing products which are intended for use at concentrations of, say about 0.15% in the wash water of an automatic home laundry machine, one suitable amount of enzyme mixture is such as to provide 1 Anson unit of the alkaline protease for each 100 to 500 (e.g. 200 to 400) grams of the wahsing product.

It is understood that the foregoing detailed description is given merely by way of illustration and that variations may be made therein without departing from the spirit of the invention. Thus while the magnesium binder described herein is shown as the sole binder it is evident that other minor amounts of binding materials as well as the usual additives and adjuvants of detergent compositions may be incorporated into the compositions provided they do not adversely affect the solubility, stability and other properties.

I claim:

1. Water-soluble enzyme granules characterized by good flow properties, resistance to caking, segregation and dusting, and which have improved enzyme stability consisting essentially of 5–95% by weight of a magnesium alkyl sulfate having an average chain length of between 10 to 16 carbon atoms or an ethoxylate thereof containing from about 5 to 50 moles of ethylene oxide, 5 to 20% by weight of water, and a proteolytic enzyme in an amount sufficient to provide about 0.1 to 4 Anson units per gram of granules, said granules being produced by extrusion and being in the form of cylindrical rods having a diameter of about 0.4 mm. to 0.8 mm. and a length of about 2 mm. to 10 mm. or in the form of spheres having a diameter of about 0.5 mm. to 1 mm., which form is suitable for addition to particulate washing products having a diameter of about 0.2 mm. to 2 mm.

2. Granules as in claim 1 in which said blend contains sodium sulfate.

3. Granules as in claim 1 which are compact and whose individual granule density is about 1.2 to 1.6 grams per cubic centimeter.

4. In a fabric-cleaning mixture of a peroxy compound and a proteolytic enzyme, the improvement in which said enzyme is present in the granules of claim 1.

5. Product as in claim 4 in which said fabric-cleaning mixture is a built heavy duty detergent composition containing water-soluble organic detergent and alkaline builder salt.

6. Product as in claim 1 in which said organic detergent is anionic.

* * * * *